(12) United States Patent
Nagakura et al.

(10) Patent No.: US 7,343,799 B2
(45) Date of Patent: Mar. 18, 2008

(54) APPARATUS FOR DETECTING LIQUID LEVEL

(75) Inventors: Shunsuke Nagakura, Haibara-gun (JP); Hisafumi Maruo, Haibara-gun (JP); Manabu Ooishi, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/228,321

(22) Filed: Aug. 27, 2002

(65) Prior Publication Data

US 2003/0037612 A1 Feb. 27, 2003

(30) Foreign Application Priority Data

Aug. 27, 2001 (JP) ............................. P2001-256724

(51) Int. Cl.
 *G01F 23/32* (2006.01)
(52) U.S. Cl. ..................................... 73/317; 73/290 R
(58) Field of Classification Search ............. 73/290 R, 73/305, 314, 317
 See application file for complete search history.

(56) References Cited

U.S. PATENT DOCUMENTS

| | | | |
|---|---|---|---|
| 4,318,075 A | | 3/1982 | Pudelko et al. |
| 4,441,364 A | * | 4/1984 | Montie .......................... 73/313 |
| 4,924,704 A | * | 5/1990 | Gaston .......................... 73/317 |
| 5,051,719 A | * | 9/1991 | Gaston et al. ............... 338/162 |
| 5,140,303 A | * | 8/1992 | Meyer ..................... 340/450.2 |
| 5,341,679 A | * | 8/1994 | Walkowski et al. ........... 73/317 |

(Continued)

FOREIGN PATENT DOCUMENTS

| | | |
|---|---|---|
| DE | 197 29 940 | 2/1999 |
| DE | 19729940 A1 * | 2/1999 |
| EP | 0 493 339 A1 | 7/1992 |
| EP | 0 806 637 A2 | 11/1997 |

OTHER PUBLICATIONS

Patent Abstract of Japan, Publication No. 57-124213, Aug. 3, 1982; Koito Mfg. Co., Ltd.

*Primary Examiner*—Hezron Williams
*Assistant Examiner*—Rodney Frank
(74) *Attorney, Agent, or Firm*—Sughrue Mion, PLLC

(57) ABSTRACT

In an apparatus for detecting a liquid level, a sliding arm is supported on the resistance plate so as to pivot thereon in accordance with the liquid level. A plurality of first conductive segments is arranged on the resistance plate in a pivoting direction of the sliding arm. Adjacent ones of the first conductive segments are connected by resistive elements respectively. A plurality of second conductive segments are electrically connected to each other, and arranged on the resistance plate in the pivoting direction. A first contact part is provided on the sliding arm, and slides on the first conductive segments in accordance with a pivoting movement of the sliding arm. A second contact part is provided on the sliding arm, and slides on the second conductive segments in accordance with the pivoting movement of the sliding arm. The first conductive segments and the second conductive segments are arranged such that a first timing, at which the first contact part is brought into contact with one of the first conductive segment, is synchronized with a second timing, at which the second contact part is brought into contact with one of the second conductive segments, while a third timing, at which the first contact part is detached from the one first conductive segment, is synchronized with a fourth timing, at which the second contact part is detached from the one second conductive segment.

20 Claims, 9 Drawing Sheets

U.S. PATENT DOCUMENTS

| | | | |
|---|---|---|---|
| 5,746,088 A * | 5/1998 | Sawert et al. | 73/317 |
| 6,127,916 A * | 10/2000 | Cooper et al. | 338/190 |
| 6,212,950 B1 * | 4/2001 | Cooper et al. | 73/313 |
| 6,389,892 B1 * | 5/2002 | Sato et al. | 73/304 R |
| 6,404,331 B1 * | 6/2002 | Hüttinger et al. | 340/450 |
| 2002/0046601 A1 * | 4/2002 | Yasuda et al. | 73/313 |
| 2002/0149380 A1 * | 10/2002 | Sato et al. | 324/699 |

* cited by examiner

PARALLEL ARRANGEMENT OF SEGMENTS

CONTACT ATTACHING ERROR IN DIRECTION OF ARROW X CAN BE ABSORBED

RADIAL ARRANGEMENT OF SEGMENTS

CONTACT ATTACHING ERROR IN DIRECTION OF ARROW X CAN NOT BE ABSORBED

APPARATUS FOR DETECTING LIQUID LEVEL

BACKGROUND OF THE INVENTION

This invention relates to an apparatus for detecting a liquid level in a fuel tank of an automobile.

FIG. 12 shows such a kind of a related apparatus for detecting a liquid level. As shown in FIG. 12, the apparatus 100 includes a resistance plate 101, and a sliding arm 102 rotating on this resistance plate 101 in conjunction with rotation of a floating arm (not shown). A first sliding part 103, which is placed in a region that is apart from the center of rotation of the sliding arm 102, and a second sliding part 104, which is placed in a region that is close to the center of rotation thereof, are provided on a base 101a of the resistance plate 101. In the first sliding part 103, a plurality of first conductive segments 105 are arranged at certain intervals nearly in a sliding direction of the sliding arm 102, and any adjacent two of the first conductive segments 105 are connected to each other through a resistive element 106. In the second sliding part 104, a plurality of second conductive segments 107 are arranged at certain intervals nearly in the sliding direction of the sliding arm 102, and any adjacent two of the second conductive segments 107 are electrically conducted to each other by a conductive member that is the same as the second conductive segment 107. One end portion of each of the first sliding part 103 and the second sliding part 104 is set to be an E-point (that is, an empty point) portion 108. The other end portion of each of the first sliding part 103 and the second sliding part 104 is set to be an F-point (that is, a full point) portion 109. A connection land part 110 is electrically connected to each of the F-point portions 109. Lead wires (not shown) are connected to both the connection land parts 110, respectively. Detection outputs are obtained from both the connection land parts 110 through the lead wires.

The sliding arm 102 is constituted by a conductive member, and has a first contact part 120, which slides on the first sliding part 103, and a second contact part 121, which slides on the second sliding part 104. The first sliding part 103 and the second sliding part 104 are electrically connected to each other through this sliding arm 102.

In the case of the apparatus of the above configuration, when the sliding arm 102 rotates according to a liquid level, the first contact part 120 and the second contact part 121 slide on the first sliding part 103 and the second sliding part 104, respectively. The first contact part 120 comes in contact with a certain one of the conductive segments 105 of the first sliding part 103, while the second contact part 121 comes in contact with the second sliding part 104. Further, the main resistance of an electric circuit composed of the first sliding part 103, the sliding arm 102, and the second sliding part 104 is the resistance of the resistive element 106 disposed between the F-point portion 109 of the first sliding part 103 and the first conductive segment 108 with which the first contact part 120 comes in contact. Thus, a quantity of electricity corresponding to the sliding position of the sliding arm 102, that is, to the liquid level position is obtained from between both the connection lands 110.

Incidentally, when the state of the first contact part 120 of the sliding arm 102 is changed from a state, in which the first contact part 120 is in contact with a given one of the first conductive segments 105, to another state, in which the first contact part 120 is in contact with the adjacent one of the first conductive segments 105, the magnitude of the resistance of the resistive element 106 disposed between an adjoining two of the first conductive segments 105 is increased and decreased stepwise. Thus, a variation in the liquid level is detected as a stepwise change.

Meanwhile, as illustrated in FIG. 13, the first conductive segments 105 and the second conductive segments 107 are placed at the same position nearly in the sliding direction (that is, Y-direction) of the sliding arm 102 at the same intervals T3 in the related apparatus 100 in such a way as to have the same width W3. Therefore, in a section in which the first contact part 120 is in contact with certain one of the first conductive segments 105, the following three states occur. That is, a state in which the second contact part 121 touches only a certain one of the second conductive segments 107, another state in which the second contact part 121 touches this certain second conductive segment 107 and the second conductive segments 107 that are adjacent thereto, and another state in which the second contact part 121 touches only the adjacent second conductive segments 107. Further, the conductor resistance of the second sliding part 104 has different values respectively corresponding to such states. Thus, in the case that the resistance corresponding to the resistance value characteristic of the above electric circuit includes the conductor resistance of the second sliding part 104, variation in the resistance value characteristic occurs. Consequently, variation in the liquid level is not obtained as regular stepwise change.

SUMMARY OF THE INVENTION

It is therefore an object of the present invention to provide an apparatus for detecting a liquid level enabled to facilitate the management of resistance of the second sliding part and also enabled to prevent variation in the resistance value characteristic of the entire electric circuit.

In order to achieve the above object, according to the present invention, there is provided an apparatus for detecting a liquid level comprising:

a resistance plate;

a sliding arm, supported on the resistance plate so as to pivot thereon in accordance with the liquid level;

a plurality of first conductive segments, arranged on the resistance plate in a pivoting direction of the sliding arm;

resistive elements, each connecting adjacent ones of the first conductive segments;

a plurality of second conductive segments, electrically connected to each other, and arranged on the resistance plate in the pivoting direction;

a first contact part, provided on the sliding arm, and sliding on the first conductive segments in accordance with a pivoting movement of the sliding arm; and a second contact part, provided on the sliding arm, and sliding on the second conductive segments in accordance with the pivoting movement of the sliding arm;

wherein the first conductive segments and the second conductive segments are arranged such that a first timing, at which the first contact part is brought into contact with one of the first conductive segment, is synchronized with a second timing, at which the second contact part is brought into contact with one of the second conductive segments, while a third timing, at which the first contact part is detached from the one first conductive segment, is synchronized with a fourth timing, at which the second contact part is detached from the one second conductive segment.

Preferably, the first conductive segments and the second conductive segments are arranged such that a first angle in which the sliding arm is pivoted during the first contact part is brought into contact with the one first conductive segment, is identical with a second angle in which the sliding arm is pivoted during the second contact part is brought into contact with the one second conductive segment.

In this configuration, the timing, with which the resistance at the side of the plurality of first conductive segments increases or decreases, coincides with the timing with which the resistance at the side of the plurality of second conductive segments increases or decreases. Consequently, the management of the resistance at the side of the second conductive segments is facilitated. Moreover, an occurrence of variation in the resistance value characteristic of the entire electric circuit can be prevented.

Preferably, opposed two sides of each of the first conductive segments extend in a first direction; and opposed two sides of each of the second conductive segments extend in parallel with a second direction which is parallel with the first direction.

Here, it is preferable that, a direction perpendicular to the first direction is third direction, a distance from a pivot center of the sliding arm to a contact point of the first contact part is defined as R1, and a distance from the pivot of the sliding arm to a contact point of the segment contact part is defined as R2;

an angle between the third direction and an extending direction of the sliding arm at the first timing is defined as θ1, an angle between the third direction and an extending direction of the sliding arm at the third timing is defined as θ2, a first width of each first segment in the third direction is defined as R1(cos θ2−cos θ1), and a second width of each second segment in the third direction is defined as R2(cos θ2−cos θ1).

In the configuration, when a position, at which the sliding arm is attached on the resistance plate, is shifted in parallel to the first direction, the contact positions, at which the first contact part and the second contact part of the sliding arm are in contact with the one of first conductive segments and the one of second conductive segments, are merely shifted on the same first conductive segment and the same second conductive segment. Thus, the detecting accuracy is prevented from being degraded owing to an attaching error in attaching the sliding arm and the resistance plate to each other, which is caused in the parallel direction.

Preferably, the plurality of first conductive segments are arranged on a first concentric circle of the pivot center, and each of the first conductive segments extends in a radial direction of the first concentric circle; and the plurality of second conductive segments are arranged on a second concentric circle of the pivot center, and each of the second conductive segments extends in a radial direction of the second concentric circle.

Preferably, the first contact part has a first semisphere portion;

the second contact part has a second semisphere portion; and a dimension ratio of a first diameter of the first semisphere portion to a first width of one of the first conductive segments in the pivoting direction, is substantially identical with a dimension ratio of a second diameter of the second semisphere portion to a second width of one of the second conductive segments in the pivoting direction.

In this configuration, an output error is prevented as much as possible from being caused by abrasion of the second contact part, which thus comes in contact with the plurality of second conductive segments.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Hereinafter, embodiments of the invention will be described below with reference to the accompanying drawings.

Figure 1:
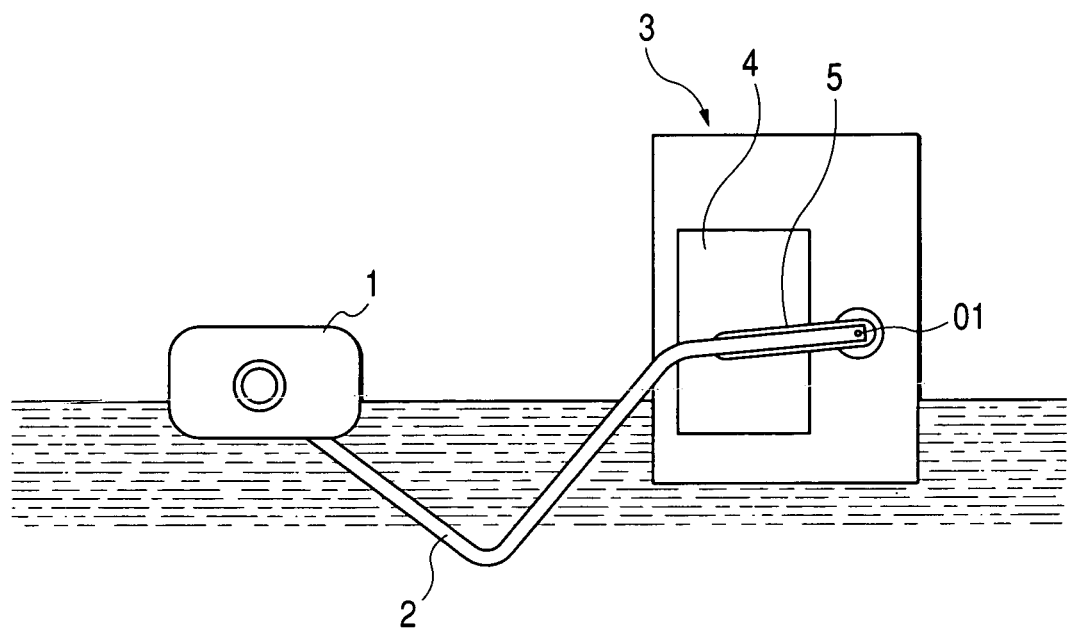
FIG. 1 shows a schematic general view illustrating an apparatus for detecting a liquid level according to a first embodiment of the invention.

FIGS. 1 to 8B show a first embodiment of the invention. As shown in FIG. 1, a float 1 floating on a liquid surface is supported at an end of a floating arm 2, the base end of which is pivotally supported on a detecting apparatus body 3. The detecting apparatus body 3 is provided with a resistance plate 4 and a sliding arm 5 that rotates on this resistance plate 4 by being synchronized with rotation of the floating arm 2.

Figure 2:
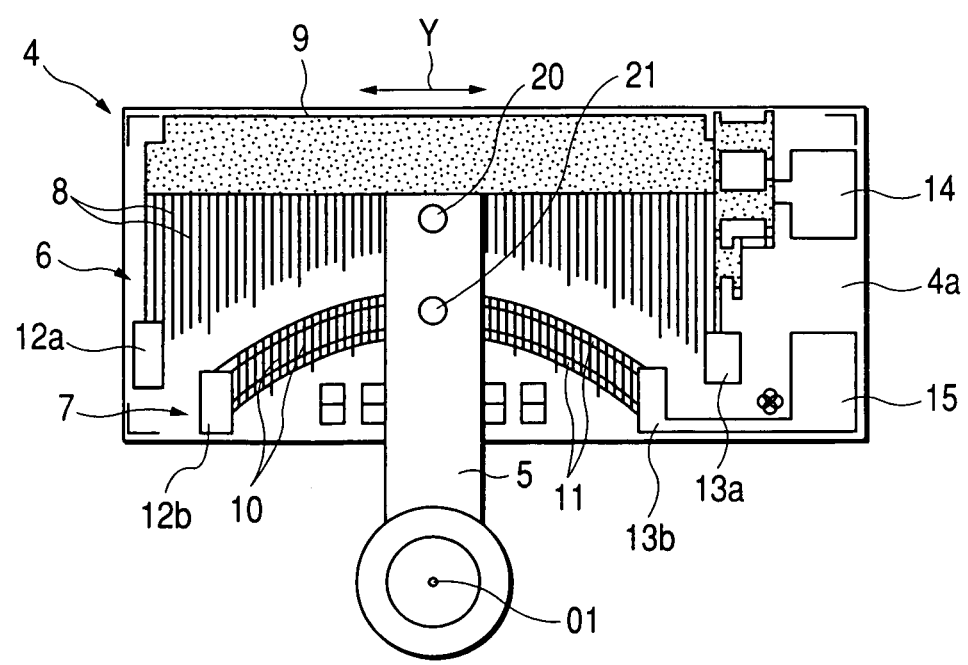
FIG. 2 shows a front view illustrating the apparatus for detecting a liquid level according to the first embodiment of the invention.

As shown in FIG. 2, a first sliding part 6, which is placed in a region that is apart from the center O1 of rotation of the sliding arm 5, and a second sliding part 7, which is placed in a region that is close to the center O1 of rotation thereof, are provided on a base 4a of the resistance plate 4. In the first sliding part 6, a plurality of first conductive segments 8 are arranged at certain intervals nearly in a sliding direction Y of the sliding arm 5, and any adjacent two of the first conductive segments 8 are connected to each other through a resistive element 9. In the second sliding part 7, a plurality of second conductive segments 10 are arranged at certain intervals nearly in the sliding direction Y of the sliding arm 5, and any adjacent two of the second conductive segments 10 are electrically conducted to each other by an conductive connection member 11 that is the same as the second conductive segment 10.

Figure 3A:
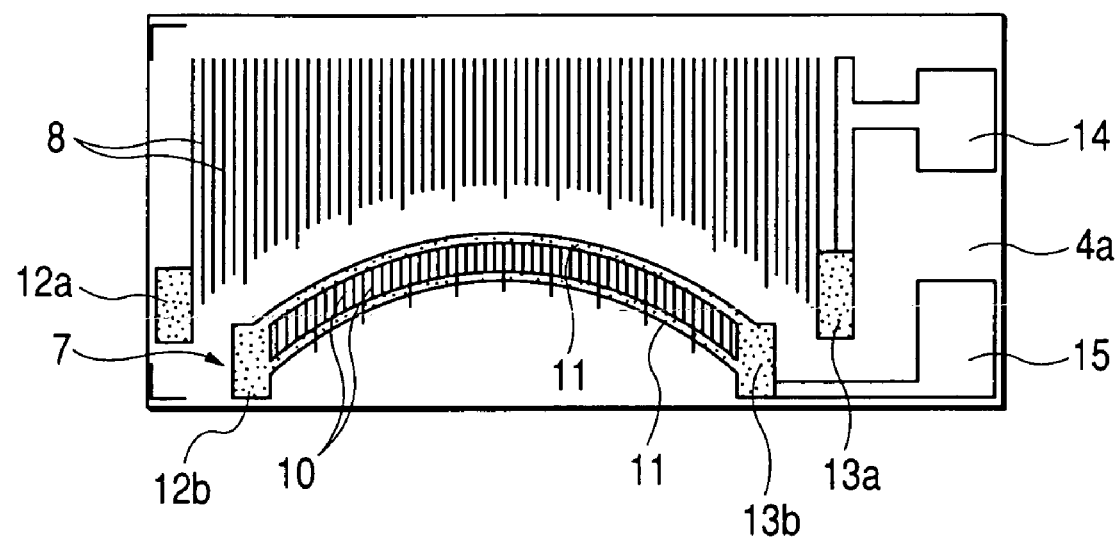
FIG. 3A shows a front view illustrating a state in which the conductive portions of a first sliding part and a second sliding part are printed on a resistance plate according to the first embodiment of the invention.
Figure 3B:
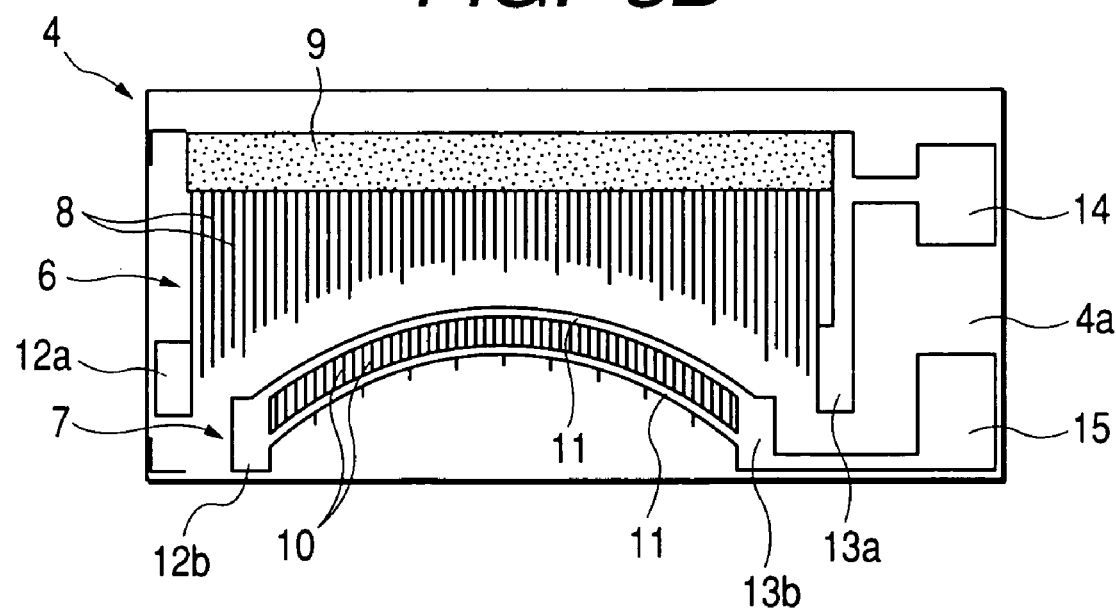
FIG. 3B shows a front view illustrating a state in which a resistive element is printed thereon according to the first embodiment of the invention.

One end portion of each of the first sliding part 6 and the second sliding part 7 is set to be a corresponding one of E-point (that is, empty point) portions 12a and 12b. The other end portion of each of the first sliding part 6 and the second sliding part 7 is set to be a corresponding one of F-point (that is, full point) portions 13a and 13b. Connection land parts 14 and 15 to be electrically connected to the F-point portions 13a and 13b, respectively, are provided in such a way as to be extended therefrom. Then, detection outputs are obtained from both the connection land parts 14 and 15. Such a resistance plate 4 is produced as follows. That is, first, the first conductive segments 8 of the first sliding part 6, the second conductive segments 10 of the second sliding part 7, and the conductive connecting portion 11 are formed by screen-printing, made of conductive materials, on the base 4a, as illustrated in FIG. 3A. Subsequently, the resistive element 9 of the first sliding part 6 is formed by screen-printing made of a resistive material.

Figure 8A:
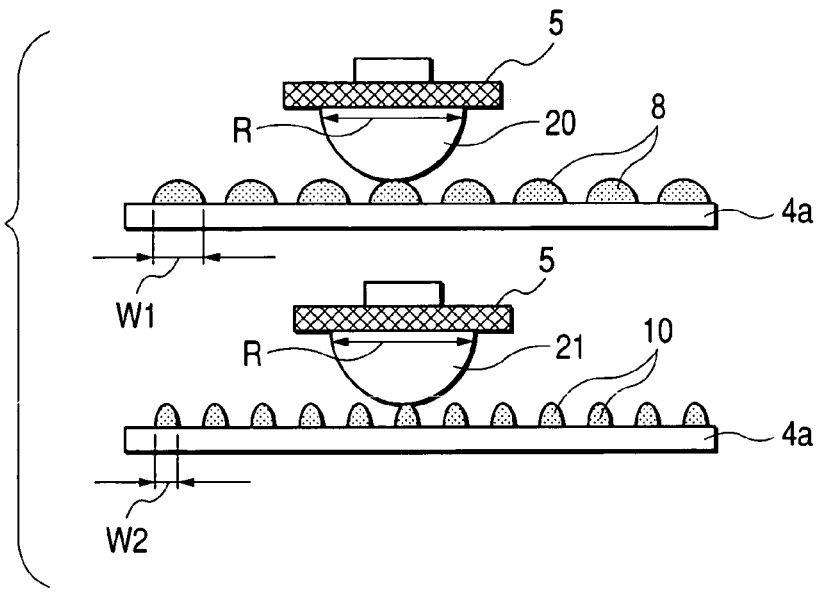
FIG. 8A shows a sectional view illustrating a state in which a first contact part and a second contact part are in contact with each other before wearing out.

As illustrated in FIGS. 2 and 8A, the sliding arm 5 is constituted by a conductive member, and has a first contact part 20, which slides on the first sliding part 6, and a second contact portion 21 that slides on the second sliding part 7. The first contact part 20 and the second contact part 21 each have a semispherical shape. In this first embodiment of the invention, the semispherical contact parts 20 and 21 are set to have the same diameter R.

Figure 4:
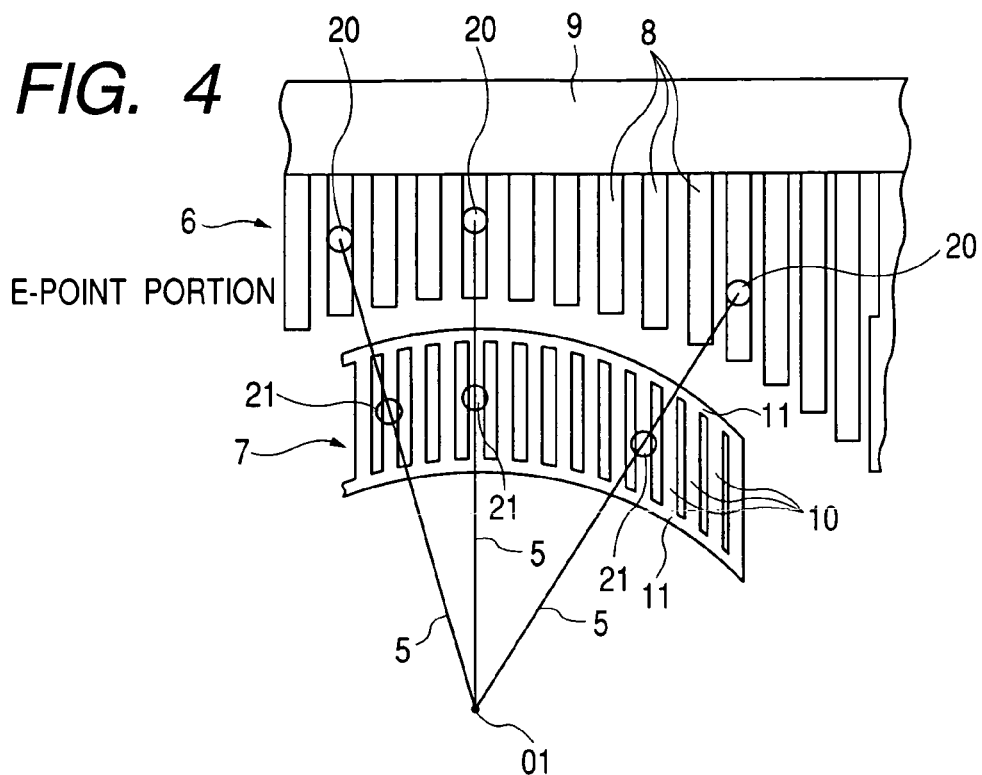
FIG. 4 shows a view illustrating an arrangement pattern of first conductive segments and second conductive segments according to the first embodiment of the invention.
Figure 5:
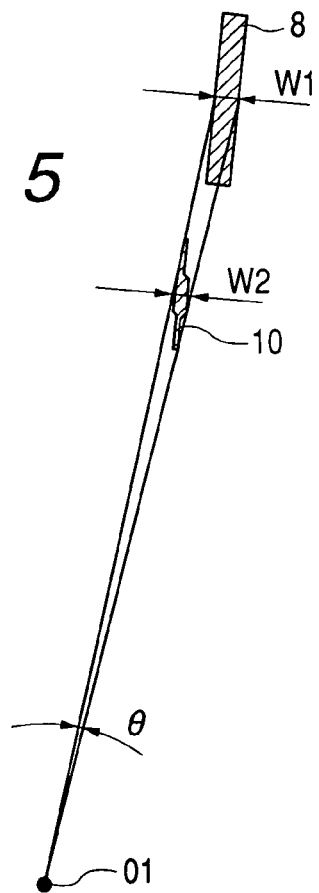
FIG. 5 shows a view illustrating the placement positions and widths of the first conductive segment and the second conductive segment according to the first embodiment of the invention.
Figure 6:
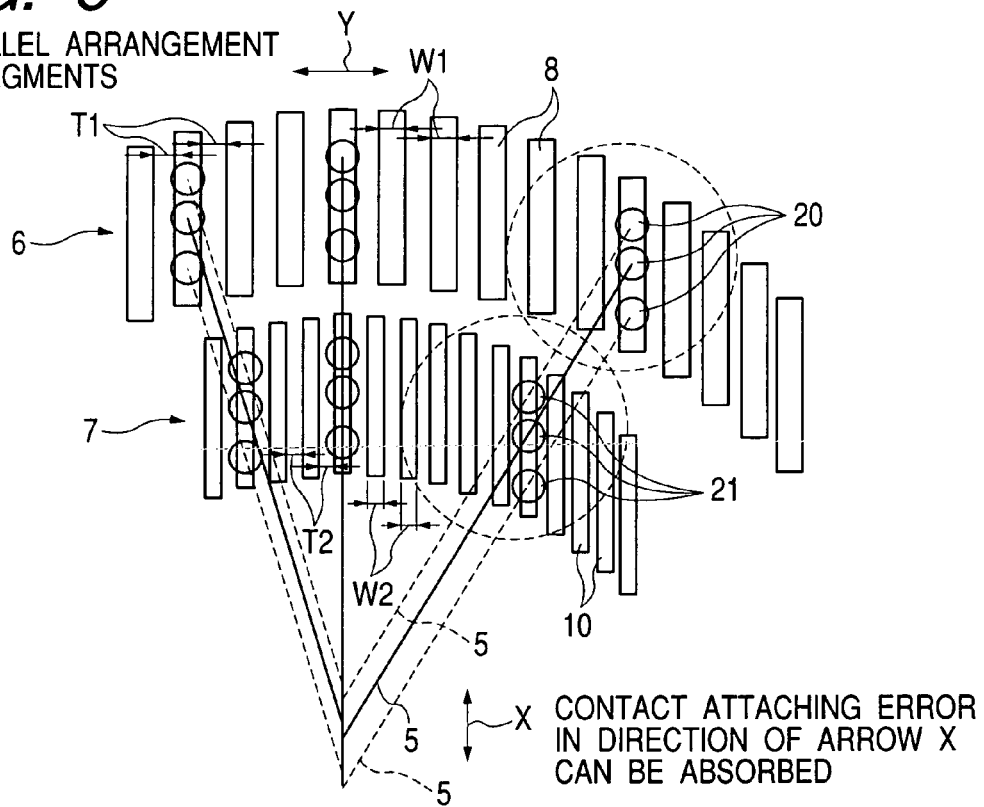
FIG. 6 shows a view illustrating a state in which the first conductive segments and the second conductive segments are placed in parallel with one another according to the first embodiment of the invention.

Next, the placement of the first conductive segments 8 and the second conductive segments 10 is described below. As illustrated in FIGS. 4 to 6, the first conductive segments 8 and the second conductive segments 10 are arranged nearly in the sliding direction (that is, the Y-direction) of the sliding arm 5 at different intervals T1 and T2 and with different widths W1 and W2 so that when the sliding arm 5 rotates, the first contact portion 20 and the second contact portion 21 come in contact with the corresponding first conductive segment 8 and the corresponding second conductive segment 10, that the contact/detachment timing, with which the first contact part 20 is brought into contact with and detached from the corresponding first conductive segment 8, is synchronized with contact/detachment timing, with which the second contact part 21 is brought into contact with and detached from the corresponding second conductive segment 10. That is, the intervals T1 and T2 and the widths W1 and W2 are set so that a deflection angle range θ corresponding to a range, in which the first contact part 20 slides on the first conductive segments 8, is the same as a deflection angle range θ corresponding to a range, in which the second contact part 21 slides on the second conductive segments 10.

The movement of the sliding arm 5 is a rotational movement thereof around a center of rotation thereof. As illustrated in FIGS. 4 and 6, the arrangement pattern of a plurality of first conductive segments 8 and a plurality of second conductive segments 10 is a parallel arrangement in which the plurality of first conductive segments 8 and the plurality of second conductive segments 10 are arranged at intervals in parallel to the sliding arm employing a circumferential direction as the sliding direction thereof.

In the apparatus of the above configuration, when the sliding arm 5 rotates according to a liquid level, the first contact part 20 and the second contact part 21 slide on the first sliding part 6 and the second sliding part 7, respectively. Thus, a quantity of electricity corresponding to the sliding position of the sliding arm 5, that is, to the liquid level position is obtained from between both the connection lands 14 and 15. Incidentally, at the rotational movement of the sliding arm 5, when the state of the first contact part 20 is changed from a state, in which the first contact part 20 is in contact with given one of the first conductive segments 8, to another state, in which the first contact part 20 is in contact with the adjacent one of the first conductive segments 8, the magnitude of the resistance of the resistive element 9 disposed between adjoining two of the first conductive segments 8 is increased and decreased stepwise. Further, the second contact part 21 moves on the second conductive segments 10 in synchronization with timing with which the first contact part 20 moves on the first conductive segments 8. Thus, the timing, with which the resistance of the first sliding part 6 increases or decreases, coincides with the timing with which the resistance of the second sliding part 7 increases or decreases. Consequently, the management of the resistance of the second sliding part 7 is facilitated. Moreover, an occurrence of variation in the resistance value characteristic of the entire electric circuit can be prevented. Hence, a variation in the liquid level can be detected as a regular stepwise change in the quantity of electricity.

Figure 7:
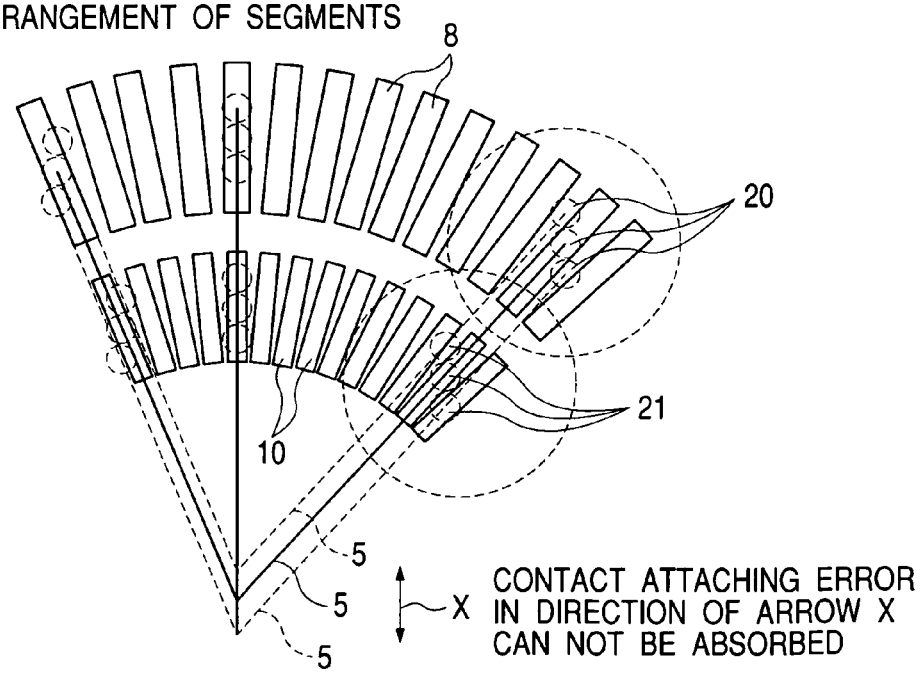
FIG. 7 shows a view illustrating a case that the first conductive segments and the second conductive segments are placed in a radial manner according to the first embodiment of the invention.

Furthermore, in the first embodiment, the movement of the sliding arm 5 according to a liquid level is a rotational movement thereof around a center of rotation thereof. Moreover, the arrangement pattern of the plurality of first conductive segments 8 and the plurality of second conductive segments 10 is a parallel arrangement in which the plurality of first conductive segments 8 and the plurality of second conductive segments 10 are arranged at intervals in parallel to the sliding arm 5 employing a circumferential direction as the sliding direction thereof. Thus, as illustrated in FIG. 6, even when a position, at which the sliding arm 5 and the resistance plate 4 are attached to each other, is shifted in a direction X that is parallel to the first conductive segments 8 and the second conductive segments 10, the contact positions, at which the first contact part 20 and the second contact part 21 of the sliding arm are in contact with the first conductive segment 8 and the second conductive segment 10, are merely shifted on the same first conductive segment 8 and the same second conductive segment 10. Thus, the detecting accuracy is prevented from being degraded owing to an attaching error in attaching the sliding arm 5 and the resistance plate 4 to each other, which is caused in the parallel direction X. That is, in the case that the first conductive segments 8 and the second conductive segments 10 are arranged around the center O1 of rotation of the sliding arm 5 in a radial manner as illustrated in FIG. 7, when an attaching error occurs in the parallel direction X, such an attaching error cannot be absorbed. However, the parallel arrangement of segments of present invention shown in FIG. 6 enabled to prevent the detecting accuracy from being degraded owing to the attaching error can be provided by employing a structure, in which the attaching error occurs only in the parallel direction X, as a structure for attaching the resistance plate 4 and the sliding arm 5 to each other.

Figure 8B:
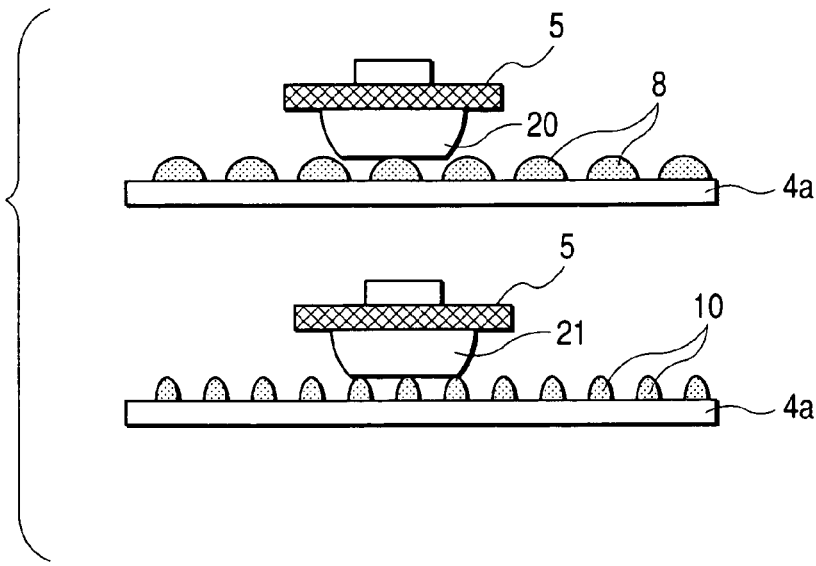
FIG. 8B shows a view illustrating a state in which the first contact part and the second contact part are in contact with each other after wearing out according to the first embodiment of the invention.

Moreover, as illustrated in FIG. 8A, in the first embodiment, the first contact part 20 and the second contact part 21 are nearly in point-contact with the first conductive segment 8 and the second conductive segment 9 before wearing out. Thus, during a state in which the first contact part 20 is in contact with given one of the first conductive segments 8, the second contact part 21 is put in a state in which this part 21 is in contact only with the corresponding second conductive segment 10. Consequently, an accurate detection output is obtained. However, as illustrated in FIG. 8B, the first contact part 20 and the second contact part 21 are in surface contact with the first conductive segment 8 and the second conductive segment 10 after wearing out. Thus, during a state in which the first contact part 20 is in contact with given one of the first conductive segments 8, the second contact part 21 is put in a state in which this part 21 in contact only with a plurality of second conductive segments 10. Consequently, there is a fear that an accurate detection output cannot be obtained. It is a second embodiment of the invention that eliminates such inconvenience.

Next, the second embodiment of the invention will be described below with reference to FIGS. 9 to 11.

As compared with the first embodiment, the second embodiment differs from the first embodiment only in the constitution of the second contact part 21. The remaining configuration of the second embodiment is the same as that of the first embodiment. Therefore, in the remaining configuration of second embodiment shown in FIGS. 9, 10A and 10B, components as same as the components described in configuration of the first embodiment are appended same reference characters, and the detailed explanations regarding the components are omitted.

Figure 9:
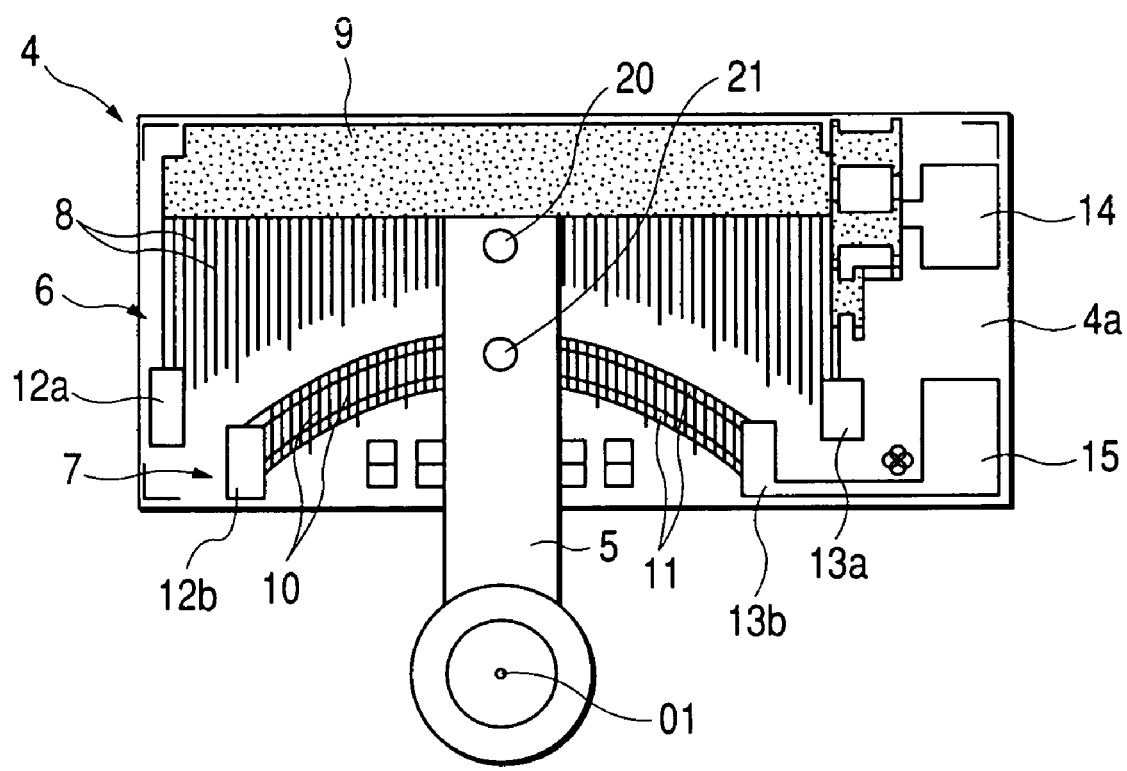
FIG. 9 shows a front view illustrating an apparatus for detecting a liquid level according to a second embodiment of the invention.
Figure 10A:
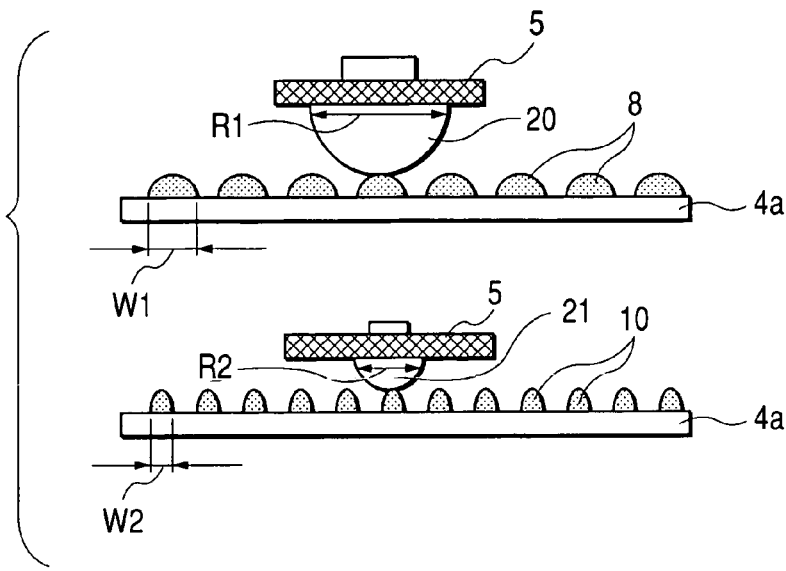
FIG. 10A shows a sectional view illustrating a state in which a first contact part and a second contact part are in contact with conductive segments before wearing out according to the second embodiment of the invention.
Figure 10B:
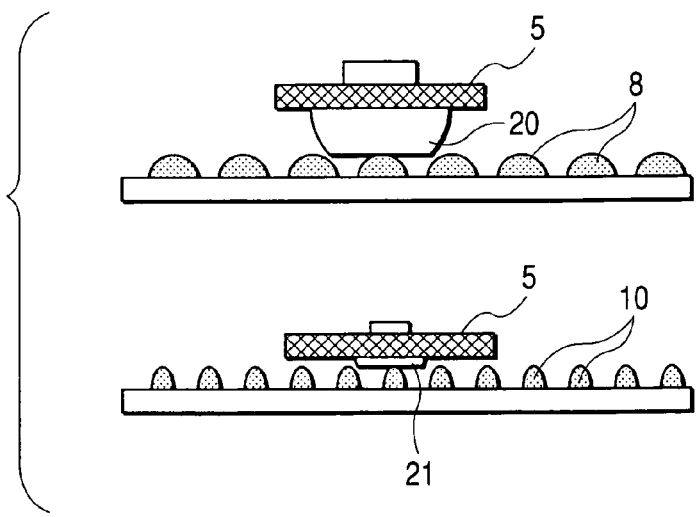
FIG. 10B shows a view illustrating a state in which the first contact part and the second contact part are in contact with the conductive segments after wearing out according to the second embodiment of the invention.
Figure 11:
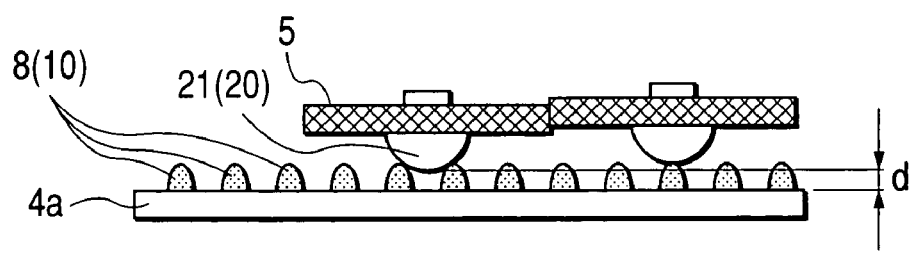
FIG. 11 shows a sectional view illustrating a state in which the second contact part (or the first contact part) is placed between adjacent two of second conductive segments (or first conductive segments) according to the second embodiment of the invention.
Figure 12:
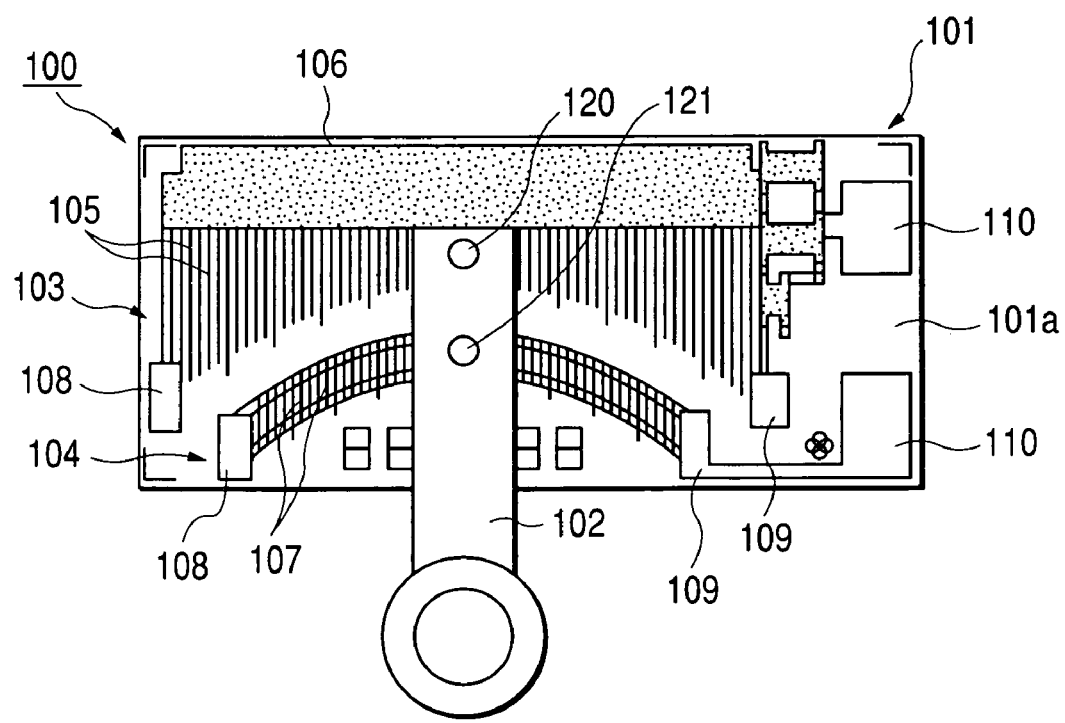
FIG. 12 shows a front view illustrating a related apparatus for detecting a liquid level according to a related apparatus.
Figure 13:
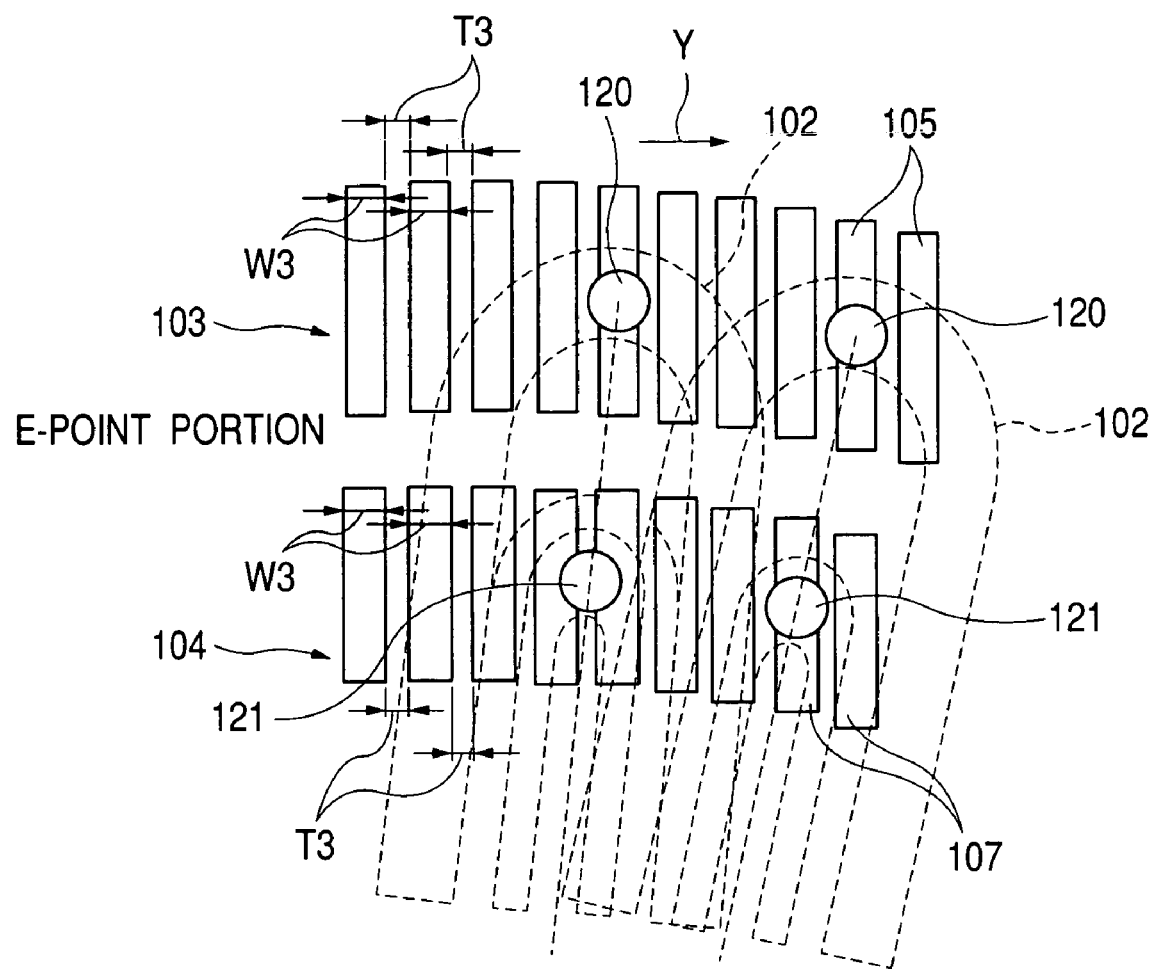
FIG. 13 shows a view illustrating placement positions and widths of the first conductive segments and those of the second conductive segments according to the related apparatus.

That is, as illustrated in FIGS. 9, 10A, and 10B, the first contact part 20 is constructed like a hemisphere having a diameter R1, while the second contact part 21 is constructed like a hemisphere having a diameter R2 which is smaller than the diameter R1. Particularly, the dimension ratio of the diameter R2 of a circular arc portion of the second contact part 21 to the width W2 in the sliding direction of the second conductive segment 10 is set to be nearly equal to that of the diameter R1 of a circular arc portion of the first contact part 20 to the width W1 in the sliding direction of the first conductive segment 8. Incidentally, the diameters R2 and R1 of the second and first contact parts 21 and 20 are set so that both the contact parts 21 and 20 are not in contact with the base 4a, which is disposed thereunder, when the second and first contact parts 21 and 20 are positioned between the corresponding adjacent two of the second conductive segments 10 and the first conductive segments 8, as illustrated in FIG. 11. In this embodiment, the diameters are set so that when the second contact part 21 and the first contact part 20 are respectively placed between the adjacent second conductive segments 10 and between the adjacent first conductive segments 8, the contact parts 21 and 20 are separated from the base 4a by a distance d.

Even this second embodiment can obtain operations and effects similar to those of the first embodiment.

Further, as illustrated in FIG. 10B, in the second embodiment, the first contact part 20 and the second contact part 21 are in surface contact with the first conductive segment 8 and the second conductive segment 10, respectively, after wearing out. However, in a state in which the first contact part 20 is in contact with a given one of the first conductive segments 8, the second contact part 21 can be prevented as much as possible from contacting the plurality of second conductive segments 10. Therefore, the second embodiment can prevent an occurrence of an output error due to the phenomena that the second contact part 21 wears out and comes in contact with the plurality of second conductive segments 10.

Moreover, in the second embodiment, the diameters R2 and R1 of the second and first contact parts 21 and 20 are set so that both the contact parts 21 and 20 are not in contact with the base 4a, which is disposed thereunder, when the second and first contact parts 21 and 20 are positioned between the corresponding adjacent two of the second conductive segments 10 and the first conductive segments 8. Therefore, when the second contact part 21 and the first contact part 20 slide between the second conductive segments 10 and between the first conductive segments 8, respectively, the contact parts 21 and 20 are floated up from the base 4a by the distance d. Hence, the second embodiment can prevent an occurrence of a state in which the first contact part 20 and the second contact part 21 are in noncontact with the first conductive segment 8 and the second conductive segment 10, respectively.

Incidentally, according to the first and second embodiments, the first sliding part 6 is placed in a region that is apart from the center O1 of rotation of the sliding arm 5, while the second sliding part 7 is placed in a region that is close to the center O1 of rotation thereof. Conversely, the second sliding part 7 may be placed in a region that is apart from the center O1 of rotation of the sliding arm 5, and the first sliding part 6 may be placed in a region that is close to the center O1 of rotation thereof. In this case, the set dimensions of the interval T1 and the width W1 of the first conductive segments 8 are exchanged with those of the interval T2 and the width W2 of the second conductive segments 10, respectively.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An apparatus for detecting a liquid level comprising:
a resistance plate; a sliding arm pivoting above the resistance plate in accordance with the liquid level; a plurality of first conductive segments, arranged on the resistance plate in a pivoting direction of the sliding arm; resistive elements, each connecting adjacent ones of the first conductive segments; a plurality of second conductive segments corresponding to said plurality of first conductive segments, electrically connected to each other, and arranged on the resistance plate in the pivoting direction;

a first contact part, provided on the sliding arm, and sliding on the first conductive segments in accordance with a pivoting movement of the sliding arm; wherein the first contact part has a first semisphere portion; and a second contact part, provided on the sliding arm, and sliding on the second conductive segments in accordance with the pivoting movement of the sliding arm; wherein the second contact part has a second semisphere portion; wherein the first conductive segments and the second conductive segments are arranged such that a first timing, at which the first contact part is brought into point contact with one of the first conductive segments, is synchronized with a second timing, at which the second contact part is brought into point contact with only one of the second conductive segments which corresponds to the one first conductive segment, while a third timing, at which the first contact part is detached from the one first conductive segment, is synchronized with a fourth timing, at which the second contact part is detached from the one second conductive segment; wherein a width of each first conductive segment in the sliding direction of the sliding arm is different from a width of each second conductive segment in the sliding direction of the sliding arm; and wherein each interval between the plurality of first conductive segments in the sliding direction of the sliding arm is different from each interval between the plurality of second conductive segments in the sliding direction of the sliding arm.

2. The apparatus as set forth in claim 1, wherein the first conductive segments and the second conductive segments are arranged such that a first angle in which the sliding arm is pivoted during the first contact part is brought into contact with the one first conductive segment, is identical with a second angle in which the sliding arm is pivoted during the second contact part is brought into contact with the one second conductive segment.

3. The apparatus as set forth in claim 1, wherein opposed two sides of each of the first conductive segments extend in a first direction; and wherein opposed two sides of each of the second conductive segments extend in parallel with a second direction which is parallel with the first direction.

4. The apparatus as set forth in claim 3, wherein a direction perpendicular to the first direction is a third direction, a distance from a pivot center of the sliding arm to a contact point of the first contact part is defined as R1, and a distance from the pivot of the sliding arm to a contact point of the segment contact part is defined as R2;

wherein an angle between the third direction and an extending direction of the sliding arm at the first timing is defined as $\theta 1$, wherein an angle between the third direction and an extending direction of the sliding arm at the third timing is defined as $\theta 2$, wherein a first width of each first segment in the third direction is defined as $R1(\cos \theta 2 - \cos \theta 1)$, and wherein a second width of each second segment in the third direction is defined as $R2(\cos \theta 2 - \cos \theta 1)$.

5. The apparatus as set forth in claim 1, wherein the plurality of first conductive segments are arranged on a first concentric circle of the pivot center, and each of the first conductive segments extends in a radial direction of the first concentric circle; and wherein the plurality of second conductive segments are arranged on a second concentric circle of the pivot center, and each of the second conductive segments extends in a radial direction of the second concentric circle.

6. The apparatus as set forth in claim 1, wherein a dimension ratio of a first diameter of the first semisphere portion to a first width of one of the first conductive segments in the pivoting direction, is substantially identical with a dimension ratio of a second diameter of the second semisphere portion to a second width of one of the second conductive segments in the pivoting direction.

7. The apparatus according to claim 6, wherein the second semisphere portion has a diameter smaller than a diameter of the first semisphere portion.

8. The apparatus according to claim 6, wherein the first semisphere portion and the second semisphere portion have a same diameter.

9. An apparatus according to claim 1, further comprising:

a first sliding part, wherein said first sliding part is in a region of said resistance plate apart from a center of rotation of said sliding arm; and a second sliding part, wherein said second sliding part is in a region of said resistance plate that is close to the center of rotation of said sliding arm.

10. An apparatus according to claim 9, wherein one end portion of each of the first sliding part and the second sliding part is set to be an empty point; and wherein one end portion of each of the first sliding part and the second sliding part is set to be a full point.

11. An apparatus according to claim 9, wherein said resistive element is disposed between the full point of the first sliding part and the first conductive segment.

12. An apparatus according to claim 1, wherein said sliding arm comprises a conductive member.

13. An apparatus according to claim 1, wherein said first contact part and said second contact part of said sliding arm are shifted on the same first conductive segment and the same second conductive segment; and wherein said detecting accuracy is prevented from being degraded.

14. An apparatus according to claim 1, wherein said plurality of first conductive segments and said plurality of second conductive segments are arranged in the sliding direction of the sliding part at different timing intervals and with different widths.

15. The apparatus according to claim 1, wherein the sliding arm comprises a conductive member wherein the first and second sliding part are electrically connected to each other through the sliding arm.

16. The apparatus according to claim 1, wherein the sliding arm entirely covers a plurality of first conductive segments and a plurality of second conductive segments at a given time.

17. The apparatus according to claim 1, wherein the first conductive segments and the second conductive segments are arranged such that a first angle in which the sliding arm is pivoted during the first contact part is brought into contact with only one first conductive segment, is identical with a second angle in which the sliding arm is pivoted during the second contact part is brought into contact with only one second conductive segment.

18. An apparatus for detecting a liquid level comprising:

a resistance plate;

a sliding arm, pivoting above the resistance plate in accordance with the liquid level;

a plurality of first conductive segments, arranged on the resistance plate in a pivoting direction of the sliding arm;

resistive elements, each connecting adjacent ones of the first conductive segments;

a plurality of second conductive segments, electrically connected to each other, and arranged on the resistance plate in the pivoting direction;

a first contact part, sliding on the first conductive segments in accordance with a pivoting movement of the sliding arm;

wherein the first contact part has a first semisphere portion; and a second contact part, sliding on the second conductive segments in accordance with the pivoting movement of the sliding arm;

wherein the second contact part has a second semisphere portion;

wherein the first contact part and the second contact part are provided on the sliding arm; and wherein a width of each first conductive segment in the sliding direction of the sliding arm is different from a width of each second conductive segment in the sliding direction of the sliding arm;

wherein the first conductive segments and the second conductive segments are arranged such that a first timing, at which the first contact part is brought into point contact with one of the first conductive segments, is synchronized with a second timing, at which the second contact part is brought into point contact with one of the second conductive segments, while a third timing, at which the first contact part is detached from the one first conductive segment, is synchronized with a fourth timing, at which the second contact part is detached from the one second conductive segment.

19. The apparatus as set forth in claim 18, wherein opposed two sides of each of the first conductive segments extend in a first direction;

wherein opposed two sides of each of the second conductive segments extend in parallel with a second direction which is parallel with the first direction;

wherein a direction perpendicular to the first direction is a third direction, a distance from a pivot center of the sliding arm to a contact point of the first contact part is defined as R1, and a distance from the pivot of the sliding arm to a contact point of the segment contact part is defined as R2;

wherein an angle between the third direction and an extending direction of the sliding arm at the first timing is defined as $\theta 1$, wherein an angle between the third direction and an extending direction of the sliding arm at the third timing is defined as $\theta 2$, wherein a first width of each first segment in the third direction is defined as $R1(\cos \theta 2 - \cos \theta 1)$, and wherein a second width of each second segment in the third direction is defined as $R2(\cos \theta 2 - \cos \theta 1)$.

20. The apparatus as set forth in claim 18, wherein each interval between the plurality of first conductive segments in the sliding direction of the sliding arm is different from each interval between the plurality of second conductive segments in the sliding direction of the sliding arm.

* * * * *